United States Patent
Foerg

(10) Patent No.: US 10,112,065 B2
(45) Date of Patent: Oct. 30, 2018

(54) METHOD FOR INSTALLING A FIRESTOP DEVICE OR INSULATION HAVING FIRESTOP PROPERTIES AS WELL AS A FIRESTOP MODULE

(71) Applicant: Hilti Aktiengesellschaft, Schaan (LI)

(72) Inventor: Christian Foerg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 894 days.

(21) Appl. No.: 13/932,163

(22) Filed: Jul. 1, 2013

(65) Prior Publication Data
US 2014/0008086 A1 Jan. 9, 2014

(30) Foreign Application Priority Data
Jul. 3, 2012 (DE) .......... 10 2012 211 559

(51) Int. Cl.
| | |
|---|---|
| *F16L 9/14* | (2006.01) |
| *A62C 2/06* | (2006.01) |
| *F16L 59/02* | (2006.01) |
| *F16L 59/14* | (2006.01) |
| *F16L 5/04* | (2006.01) |

(52) U.S. Cl.
CPC ................ *A62C 2/06* (2013.01); *F16L 5/04* (2013.01); *F16L 59/027* (2013.01); *F16L 59/145* (2013.01)

(58) Field of Classification Search
CPC .............................. A62C 2/06; F16L 59/027
USPC ........................ 138/130, 144, 149
See application file for complete search history.

(56) References Cited

U.S. PATENT DOCUMENTS

| | | | |
|---|---|---|---|
| 2,750,030 A | 6/1956 | Tierney | |
| 2,750,314 A | 6/1956 | Bemmels | |
| 4,073,318 A * | 2/1978 | Close et al. .................. | 138/149 |
| 4,139,669 A * | 2/1979 | Chang .......................... | 428/167 |
| 4,454,192 A | 6/1984 | Suzuki | |
| 4,509,559 A * | 4/1985 | Cheetham et al. ........... | 138/121 |
| 4,595,615 A | 6/1986 | Cohen | |
| 4,946,732 A | 8/1990 | Cohen | |
| 5,307,842 A * | 5/1994 | Lequeux ....................... | 138/149 |
| 5,571,625 A * | 11/1996 | Porte et al. ................... | 428/447 |
| 5,634,304 A * | 6/1997 | Sakno ............................ | 52/232 |
| 5,758,694 A * | 6/1998 | Friedrich et al. ............. | 138/144 |
| 5,736,211 A | 8/1998 | Fontinella | |
| 5,971,030 A * | 10/1999 | Maimets ........................ | 138/98 |
| 6,610,399 B1 * | 8/2003 | Crigler ........................ | 428/375 |
| 7,056,844 B2 | 6/2006 | Sheely | |
| 2004/0151922 A1 | 8/2004 | Cohen | |

(Continued)

FOREIGN PATENT DOCUMENTS

| | | |
|---|---|---|
| DE | 871801 | 3/1953 |
| DE | 3213246 | 6/1983 |
| DE | 60217908 T | 11/2007 |

*Primary Examiner* — Vishal Pancholi
(74) *Attorney, Agent, or Firm* — Davidson, Davidson & Kappel, LLC

(57) ABSTRACT

In a method for installing a firestop device (14) or insulation having a firestop effect, on a line (12) or pipe, whereby the firestop device (14) or the insulation having a firestop effect is placed, especially wrapped, completely around the line (12) or pipe, in the circumferential direction (U), it is provided that a flexible adhesive tape (16) containing heat-resistant fibers (18) in its lengthwise direction (L) is wrapped in the circumferential direction (U) of the line (12) or pipe completely around the firestop device (14) or the insulation having a firestop effect.

20 Claims, 2 Drawing Sheets

(56) References Cited

U.S. PATENT DOCUMENTS

2006/0054235 A1* 3/2006 Cohen et al. .................. 138/149
2011/0274863 A1* 11/2011 Busch et al. .................. 428/41.7

* cited by examiner

METHOD FOR INSTALLING A FIRESTOP DEVICE OR INSULATION HAVING FIRESTOP PROPERTIES AS WELL AS A FIRESTOP MODULE

This claims the benefit of German Patent Application DE 10 2012 211 559.5, filed Jul. 3, 2012 and hereby incorporated by reference herein.

The invention relates to a method for installing a firestop device or insulation optionally having a firestop function, on a line or pipe, whereby the firestop device or the insulation optionally having a firestop function is placed, especially wrapped, completely around the line or pipe, in the circumferential direction. The invention also relates to a firestop module to be wrapped around a line or pipe.

BACKGROUND

For purposes of protection against heat, for instance, in case of fire, pipes or lines are wrapped with a firestop device, or else with insulation optionally having a firestop function. In addition to protecting the pipes or lines, the firestop device can have a suitable construction and material selection to also prevent the propagation of fire or smoke. For this purpose, such firestop device comprise, for example, an intumescent material that expands upon exposure to heat, so that it can close penetrations in the walls or ceilings and floors.

The term "firestop device" refers, for instance, to a bandage that foams or cools in case of fire and that contains an intumescent, ash-forming and/or ablative material in order to prevent propagation of fire. In case of fire, the intumescent material forms a microporous and heat-insulating foam layer which, owing to its low thermal conductivity and to the exclusion of oxygen, protects the lines and pipes from the effects of fire. In case of fire, the ash-forming material creates a stable ash crust, albeit without foaming. In general, the ablative material disintegrates, while eliminating water, as a result of which the line or pipe is cooled. The bandage can be a full bandage or a partial bandage. With the full bandage, the pipes or lines are completely wrapped, that is to say, wrapped with the bandage along their entire length, whereas, with the partial bandage, only parts of the pipes or lines are wrapped with the bandage, especially in the area of a penetration or opening in the structure. The term "bandage" as set forth in the invention refers to a full bandage as well as to a partial bandage.

An example of insulation having a firestop function is conventional line insulation or pipe insulation such as mineral wool or the like, which is, for example, coated with a firestop material (intumescent, ash-forming and/or ablative material) or which, due to its characteristics, that is to say, the material of which it is made, has a fire-retardant effect (integral fire protection). As set forth in the invention, it is in this context that the term insulation, optionally having a firestop function, is employed, so that it can encompass coated insulation as well as insulation with integral fire protection.

The firestop device or insulation is normally wrapped around the pipe or line and subsequently attached to it. This is particularly necessary when the firestop device or the insulation cannot be inserted at all or not deep enough into an annular gap between the line or the pipe and the opening in the structure. The attachment can be accomplished, for example, using a support strip made of metal that is joined to the firestop device or to the insulation and that surrounds it in the circumferential direction once the firestop device has been installed. Moreover, the state of the art comprises separate steel strips or sheet-metal cladding which additionally permit the pipe or insulation to be fastened to a wall, ceiling or floor.

SUMMARY OF THE INVENTION

A drawback of such support strips or steel strips is their laborious installation. Moreover, steel strips often have very sharp edges that could cause injury. Simple fastening possibilities such as, for example, adhesive tape, are normally not heat-resistant.

It is an object of the present invention to provide a method for installing such firestop device or insulation which allows easy attachment of the firestop device or insulation and which ensures a reliable attachment, even in case of fire. It is also an objective of the invention to put forward an easy-to-install firestop module for wrapping a line or a pipe.

The present invention provides a method for installing a firestop device or insulation having a firestop function on a line or pipe, whereby the firestop device or insulation is placed, especially wrapped, completely around the line or pipe in the circumferential direction, it is provided that a flexible adhesive tape containing heat-resistant fibers—especially glass fibers—in its lengthwise direction is wrapped in the circumferential direction of the line or pipe completely around the firestop device or the insulation having a firestop function. In this context, the term "flexible" means that the tape is so pliable or elastic that it can be easily wrapped around the sheathed line or pipe. The term "heat-resistant" means that, even at temperatures above 1000° C., the fibers remain sufficiently strong and their properties do not change so markedly that the material can no longer meets its requirements, in other words, that it loses its holding function.

Adhesive tape is normally not used for such an attachment since the materials employed for the adhesive tape as well as for the adhesive layer already soften or disintegrate at very low temperatures, as a result of which the holding function for the firestop device or the insulation is not longer present. Surprisingly, it has been found that adhesive tape with heat-resistant fibers, especially glass fibers, exhibits a very high temperature resistance, even though the adhesive layer as well as the adhesive film of such adhesive tape display a very low temperature resistance. Although the fibers of such adhesive tape likewise start to melt somewhat above a certain temperature, they form a stable, molten ceramic-like material that ensures the attachment of the firestop device or insulation having firestop properties, even at high temperatures.

This function exists even if the support film or the adhesive layer of the adhesive tape melts or disintegrates at high temperatures. The ceramic-like material ensures a reliable attachment of the firestop device or insulation to the line or to the pipe, even after having cooled off.

Experiments have shown that the stability of the molten fibers is sufficient to absorb the stresses that occur due to the expansion of the intumescent material, so that it can be used to attach such material as well.

Preferably, the adhesive tape is wrapped with at least two complete windings around the firestop device or insulation having firestop properties, so that the adhesive tape overlaps along the entire circumference. This constitutes a very stable bond.

The windings of the adhesive tape overlap, preferably at least in certain sections, so that the fibers of the individual windings are partially on top of each other. This means that they will fuse together when the adhesive tape melts or disintegrates, thus forming a stable ring around the firestop device or insulation.

Towards this end, the fibers of the individual windings are on top of each other or parallel to each other, at least in certain sections, so that they can fuse together over a larger area when the adhesive tape or the adhesive melts.

However, it is also conceivable that the fibers of the individual windings cross over each other, at least in certain sections, so that they fuse together only at these intersection points, as a result of which a stable net-like structure is formed around the firestop device or insulation after the melting procedure.

Furthermore, according to the invention, a firestop module for wrapping a line or a pipe is provided, comprising a firestop device or insulation having firestop properties as well as an adhesive tape that contains heat-resistant fibers, especially glass fibers, running in the lengthwise direction. Due to the fibers, which melt in case of fire and form a ceramic-like material, the firestop device or insulation is still held securely in place on the line or on the pipe, even in case of fire.

The firestop device or insulation can be made, at least partially, of an intumescent material that expands upon exposure to heat. Experiments have demonstrated that the strength of the molten ceramic-like material is sufficient to withstand the loads, especially the tensile stress running in the circumferential direction, that occur due to the expansion of the intumescent material.

The adhesive tape can have, for instance, a support film, especially made of PVC, as well as an adhesive layer that is made, for example, of acrylate or hot melt. The fibers are preferably embedded in the adhesive layer.

In a preferred embodiment, the adhesive tape is wrapped around the firestop device or insulation by means of a method according to the invention.

BRIEF DESCRIPTION OF THE DRAWINGS

Additional features and advantages ensue from the description below in conjunction with the accompanying drawings. These show the following.

DETAILED DESCRIPTION

Figure 1:
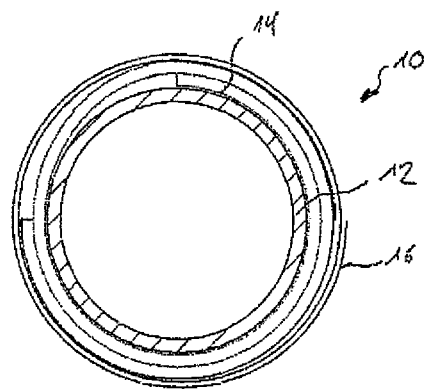
FIG. 1: a firestop module according to the invention.

FIG. 1 shows a firestop module 10 to protect a line 12. The line 12 can be, for example, a cable or a pipe that is protected by the firestop module 10 against heat exposure, for example, against fire. Depending on the position of the firestop module 10, it can also prevent the propagation of fire or smoke in that the firestop module 10 is arranged in a penetration that passes through a wall, ceiling or floor.

The firestop module 10 has a firestop device 14 made of a flexible, insulating and/or intumescent material that expands upon exposure to heat. The firestop device 14 is wrapped completely around the line 12 in the circumferential direction U, thus providing reliable heat protection for the line 12.

Figure 2:
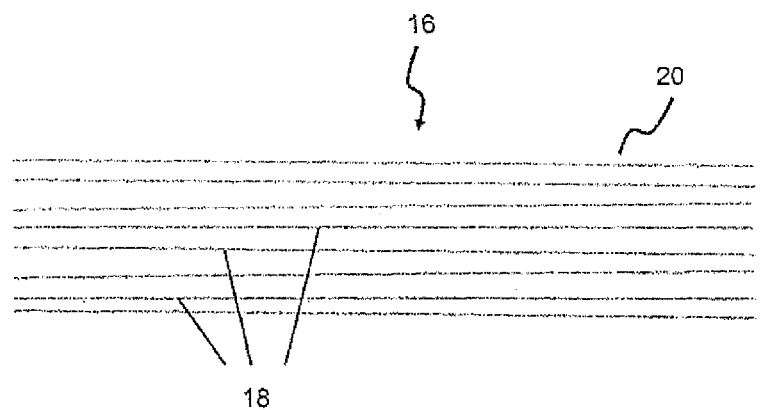
FIG. 2: a top view of the adhesive tape of the firestop module from FIG. 1.
Figure 3:
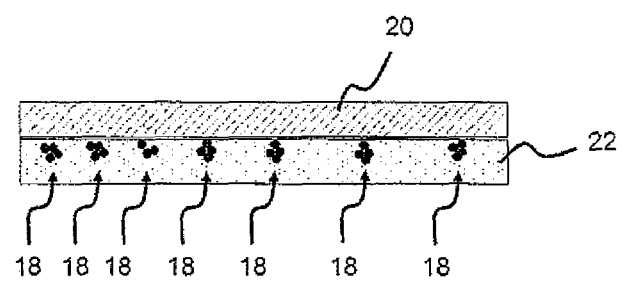
FIG. 3: a sectional view through the adhesive tape from FIG. 2.

In order to attach the firestop device 14, adhesive tape 16 containing glass fibers 18 as shown in FIGS. 2 and 3 is provided. Other heat-resistant fibers can also be employed instead of glass fibers 18.

As can be seen in FIG. 3, the adhesive tape 16 has a support film 20 that is made, for instance, of PVC or of another flexible plastic. An adhesive layer 22 made, for example, of acrylate, hot melt or another commercially available adhesive is provided on the underside of the support film 20. Individual glass fibers 18 running in the lengthwise direction are embedded in the adhesive layer 22.

As can be seen in FIG. 1, the adhesive tape 16 makes at least two complete windings of the adhesive tape 16 around the firestop device 14, and thus around the line 12, whereby the windings are on top of each other, in other words, they overlap at least partially, as a result of which the firestop device 14 is securely attached to the line 12.

Since the glass fibers 18 of the adhesive tape 16 run in the lengthwise direction L in the adhesive tape 16, they also run in the circumferential direction U around the firestop device 14.

Figure 4:
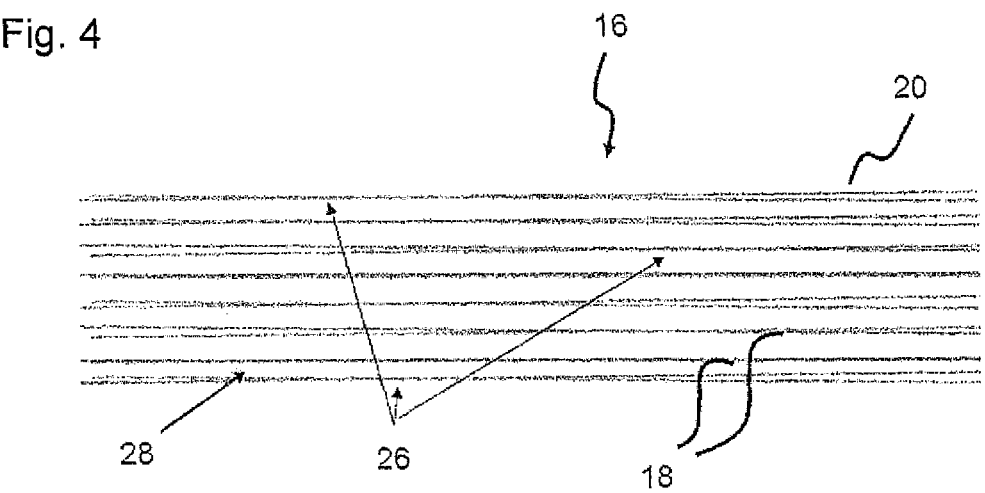
FIG. 4: a top view of the adhesive tape from FIG. 2, in its installed state on the firestop module from FIG. 1, and FIG. 5: a graph of the temperature resistance of the materials of the adhesive tape from FIG. 2, in a standardized fire test.

As can be seen in FIG. 4, the individual windings of the adhesive tape 16 overlap, so that, in certain sections, the glass fibers 18 of the individual windings run parallel to each other or on top of each other (reference numeral 26). Since the glass fibers 18 do not run parallel to each other along the entire length of the adhesive tape 16, the glass fibers of the individual windings also intersect with each other in certain sections (reference numeral 28).

Figure 5:
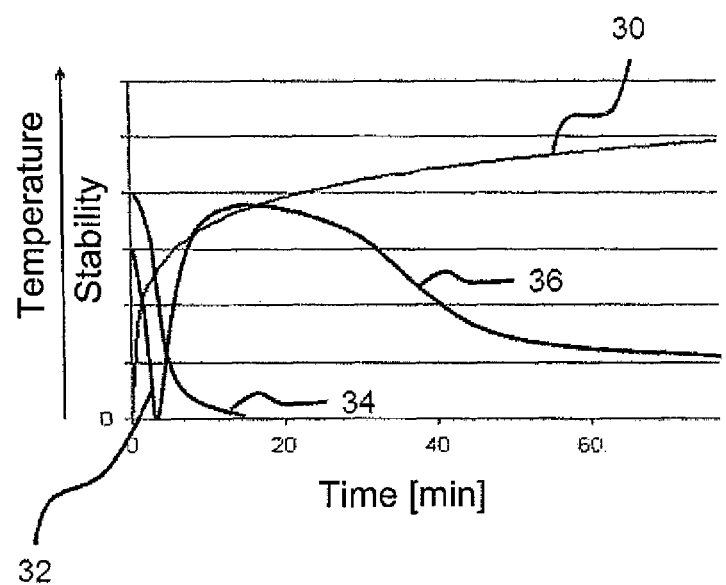

FIG. 5 shows the behavior of the individual components of the adhesive tape 16 in a standardized fire test. The curve 30 depicts the course-over-time of the temperature in this fire test. Curve 32 shows the behavior of the adhesive layer 22, while curve 34 shows the behavior of the support film and curve 36 shows the behavior of the fibers.

The adhesive layer 22 already becomes soft at very low temperatures of less than 100° C., thus exposing the glass fibers 18. In parallel to this, the PVC film disintegrates or melts, it develops adhesive properties in this process, thereby holding the glass fibers 18 in place. Melting of the glass fibers 18 starts with a time delay (curve 36).

These three curves, however, only depict the behavior of the individual materials. If these materials are combined in a multi-layered structure to form an adhesive tape 16, the individual effects are superimposed, so that, at every point in time, a material or a layer is in a tacky adhesive state during the first 20 minutes of the fire test.

After the melting process, the glass fibers 18 fuse together. Here, owing to various processes, the melting phase of the glass fibers 18 is delayed or the melting temperature of the glass fibers 18 is increased, so that they form a stable bond over a prolonged period of time. If the temperature rises further, the glass fibers lose their mechanical properties, although a certain residual stability is always still present.

Consequently, the glass fibers form a ceramic, stable bond that ensures a reliable attachment of the firestop device 14 to the line 12, even at high temperatures at which conventional adhesive tape melts and loses its holding effect. This attachment is especially ensured in that the glass fibers 18 form a ring extending completely around the firestop device 14 in the circumferential direction U.

Experiments have shown that, after a fire test, the glass fibers have sufficient stability to allow a reliable attachment of the firestop device 14 to the line 12, even in the case of intumescent materials that expand and thus exert additional stress onto the adhesive tape or onto the glass fibers 18.

Instead of the adhesive tape 16 employed here having glass fibers 18 that run exclusively in the lengthwise direction L, it is also possible to employ other adhesive tape containing heat-resistant fibers. In particular, so-called mesh adhesive tape in which some of the glass fibers 18 are arranged perpendicular to the lengthwise direction can be employed.

The firestop device as defined herein also includes insulation having a firestop effect.

What is claimed is:

1. A method for installing a firestop device or insulation on a line or pipe, comprising:
    placing the firestop device or the insulation completely around the line or pipe in the circumferential direction; and
    wrapping a flexible adhesive tape containing heat-resistant fibers in a lengthwise direction of the tape in the circumferential direction of the line or pipe completely around the firestop device or the insulation.

2. The method as recited in claim 1 wherein the firestop device or insulation includes insulation having a firestop function.

3. The method as recited in claim 1 wherein the placing includes wrapping the firestop device or insulation.

4. The method as recited in claim 1 wherein the adhesive tape is wrapped with at least two complete windings around the firestop device or insulation.

5. The method as recited in claim 4 wherein the windings of the adhesive tape overlap, at least in certain sections.

6. The method as recited in claim 4 wherein the fibers of the individual windings are on top of each other or parallel to each other, at least in certain sections.

7. The method as recited in claim 4 wherein the fibers of the individual windings cross over each other, at least in certain sections.

8. A firestop module for wrapping a line or a pipe, comprising:
    a firestop device or insulation;
    an adhesive tape including heat-resistant fibers running in a lengthwise direction of the tape.

9. The firestop module as recited in claim 8 wherein the firestop device or insulation is made, at least partially, of an ash-forming, intumescent and/or ablative material.

10. The firestop module as recited in claim 8 wherein the adhesive tape has a support film as well as an adhesive layer.

11. The firestop module as recited in claim 10 wherein the support film is made of PVC.

12. The firestop module as recited in claim 8 wherein the heat-resistant fibers include glass fibers.

13. The firestop module as recited in claim 8 wherein the firestop device or insulation includes insulation having a firestop effect.

14. A firestop module for wrapping a line or a pipe and produced by using the method as recited in claim 1, comprising:
    the firestop device or insulation; and
    the adhesive tape including the heat-resistant fibers running in a lengthwise direction of the tape.

15. The firestop module as recited in claim 8 wherein the heat-resistant fibers extend with a length sufficient to extend completely around the line or pipe.

16. The firestop module as recited in claim 8 wherein the heat-resistant fibers run exclusively in the lengthwise direction.

17. The firestop module as recited in claim 8 wherein the tape further includes further heat-resistant fibers arranged perpendicular to the lengthwise direction to form a mesh with the heat-resistance fibers.

18. The method as recited in claim 1 wherein the wrapping results in the heat-resistant fibers extending completely around the line or pipe.

19. The method as recited in claim 1 wherein the heat-resistant fibers run exclusively in the lengthwise direction.

20. The method as recited in claim 1 wherein the tape further includes further heat-resistant fibers arranged perpendicular to the lengthwise direction to form a mesh with the heat-resistance fibers.

* * * * *